(12) United States Patent
Chen

(10) Patent No.: US 6,253,449 B1
(45) Date of Patent: Jul. 3, 2001

(54) COMBINATION TOOL FOR OPTICAL OR ELECTRICAL CABLES

(75) Inventor: Wenzong Chen, Darien, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/195,290

(22) Filed: Nov. 18, 1998

(51) Int. Cl.[7] .................. B23P 19/00; H01R 43/042
(52) U.S. Cl. ........................... 29/751; 29/753; 29/758
(58) Field of Search ............... 29/748, 750, 751, 29/753, 758, 761

(56) References Cited

U.S. PATENT DOCUMENTS

| | | | | |
|---|---|---|---|---|
| 2,907,040 | * | 10/1959 | Woods | 29/741 |
| 2,946,368 | * | 7/1960 | Dexter | 29/33 M |
| 3,094,774 | * | 6/1963 | Nazarow et al. | 29/752 |
| 3,177,567 | * | 4/1965 | Gehrman | 29/750 |
| 3,267,565 | * | 8/1966 | Stuhler | 29/750 |
| 3,706,219 | * | 12/1972 | Hoffman et al. | 72/402 |
| 3,732,718 | * | 5/1973 | Barberio et al. | 72/410 |
| 3,733,674 | * | 5/1973 | Shirley | 29/751 |
| 3,994,090 | * | 11/1976 | Wheeler | 40/316 |
| 4,027,368 | * | 6/1977 | Asick | 29/751 |
| 4,450,621 | * | 5/1984 | Bianchi | 29/828 |
| 4,555,847 | * | 12/1985 | Dornes | 29/739 |
| 4,589,271 | * | 5/1986 | Laux | 72/449 |
| 4,926,685 | * | 5/1990 | Shannon, Sr. | 72/410 |
| 4,951,369 | * | 8/1990 | Verrall | 29/33 M |
| 5,074,031 | * | 12/1991 | Werner | 29/747 |
| 5,074,142 | * | 12/1991 | Heskey et al. | 72/410 |
| 5,195,352 | * | 3/1993 | Grois et al. | 72/410 |
| 5,509,194 | * | 4/1996 | Hornung et al. | 29/751 |
| 5,509,291 | * | 4/1996 | Nillson et al. | 72/409.14 |
| 5,842,371 | * | 12/1998 | Liaw | 72/409.12 |
| 5,924,322 | * | 7/1999 | Caveney | 72/409.14 |

FOREIGN PATENT DOCUMENTS 36 06 429 A1 * 2/1986 (DE).

OTHER PUBLICATIONS

Miller et al., Hand Assembly Tool For Modular Plugs, Western Electric Technical Digest, No. 53, p. 15, Jan. 1973.*

* cited by examiner

*Primary Examiner*—Lee Young
(74) *Attorney, Agent, or Firm*—A. A. Tirva

(57) ABSTRACT

A crimping tool is disclosed for compressing a connector component radially onto a cable and for assembling a pair of connector components axially of the cable. The tool includes a pair of jaws relatively movable toward and away from each other. Each jaw includes a first stage recessed area combining with the first stage recessed area of the other jaw to define a crimping cavity for compressing the connector component radially onto the cable when the jaws are relatively moved toward each other. Each jaw includes a second stage shoulder area combining with the second stage shoulder area of the other jaw to define opposing arms for assembling said pair of connector components toward each other axially of the cable when the jaws are relatively moved toward each other.

4 Claims, 2 Drawing Sheets

COMBINATION TOOL FOR OPTICAL OR ELECTRICAL CABLES

FIELD OF THE INVENTION

This invention generally relates to the art of application tooling for connectors, such as optical fiber connectors, and particularly to a combination crimping and assembly tool for compressing a connector component radially onto a cable and for assembling a pair of connector components axially of the cable.

BACKGROUND OF THE INVENTION

There are many application tools, presses and the like for terminating a wide variety of electrical or optical connectors to terminals, wires, cables or the like. One type of application tooling involves compression tools for crimping metal components about electrical or signal conductors or coaxial cables to form a structural or mechanical connection therebetween.

Many types of connector assemblies commonly have cylindrical components which are crimped onto the exterior of an insulated electrical wire having a central conductor or a fiber optic cable having a central fiber or core. The component typically is fabricated of sheet metal material which retains its crimped configuration onto the insulated wire or optical cable. The crimping forces are applied generally radially of the wire or cable.

Once the component is crimped onto the wire or cable, this subassembly (along with other connector components) may be assembled in an outer housing or other connector component. Due to the ever-increasing miniaturization of electrical and fiber optic connectors, it often is difficult to manually effect these assembly operations, and there are few assembly tools, if any, that are available for manual operation.

For instance, in a typical fiber optic connector, a crimp ring is used to clamp the strength members of a fiber optic cable onto the outside of a ferrule plug assembly, with the fiber of the cable being inserted into the ferrule. A hand tool typically is used to clamp the crimp ring radially onto the plug assembly. This subassembly then must be inserted axially into an outer connector shell. These components are very small and very difficult to manually assemble. Even if an assembly tool was available, an operator would have to carry both a crimping tool and an assembly tool to completely assembly the entire fiber optic connector.

The present invention is directed to solving these problems by providing a combination crimping and assembly tool which performs multiple functions.

SUMMARY OF THE INVENTION

An object, therefore, of the invention is to provide a new and improved crimping tool for compressing a connector component radially onto a cable and also for assembling a pair of connector components axially of the cable.

In the exemplary embodiment of the invention, the tool includes a pair of jaws relatively movable toward and away from each other. Each jaw includes a first stage recessed area combining with the first stage recessed area of the other jaw to define a crimping cavity for compressing the connector component radially onto the cable when the jaws are relatively moved toward each other. Each jaw also includes a second stage shoulder area combining with the second stage shoulder area of the other jaw to define opposing arms for assembling the pair of connector components toward each other axially of the cable when the jaws are relatively moved toward each other.

As disclosed herein, the jaws are relatively movable about a pivot axis. The first stage recessed areas are closer to the pivot axis than the second stage shoulder areas. The crimping cavity defines an axis generally parallel to the pivot axis. The opposing jaws project in a direction generally perpendicular to the pivot axis.

At least one of the opposing arms is bifurcated to define a pair of spaced shoulders for straddling a respective one of the pair of connector components. Generally, the second stage shoulder area of at least one of the jaws includes different portions to accommodate differently configured connector components. Specifically, at least one of the opposing arms includes at least two shoulders spaced at different distances from the other opposing arm to accommodate different sizes of connector components.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
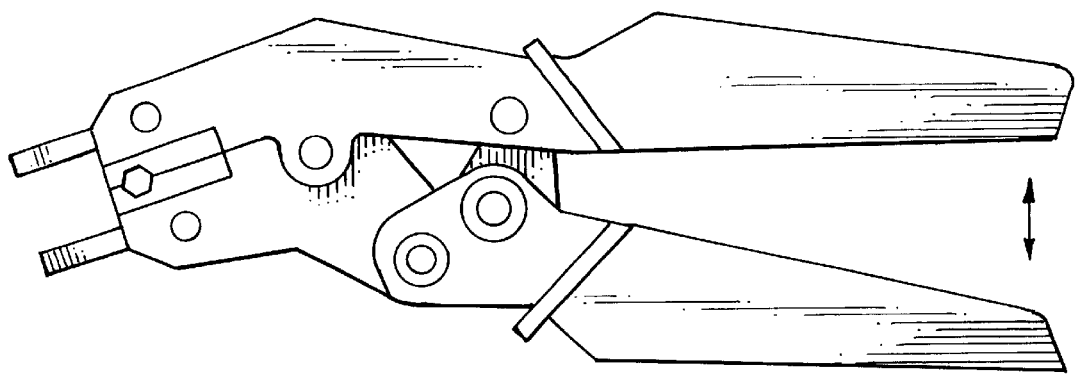
FIG. 1 is a side elevational view of a hand-held combination tool embodying the concepts of the invention, with the jaws of the tool in closed condition.

Referring to the drawings in greater detail, and first to FIG. 1, a combination crimping and assembly tool, generally designated 10, is illustrated and embodies the concepts of the invention. The tool is illustrated in the form of a hand-held, pliers-type tool as might be found for field use in electrical connector or optical fiber cable assembly applications. Of course, it should be understood that the basic principles of the invention are equally applicable for other types of tools, presses and the like.

Generally, combination tool 10 includes a pair of hand-grippable handles 12 interconnected intermediate their ends by a common toggle-type pivoting connection, generally designated 14. The handles terminate in distal ends or heads 16a and 16b. The heads are connected and relatively movable about a pivot axis 18. Head 16a is integral with one of the handles, and head 16b is a separate component pivoted to the other handle on pivot axis 20. The two handles are interconnected by a toggle link 22 pivoted to the handles on axes 24. As with such pliers-type tools, moving handles 12 toward and away from each other in the direction of double-headed arrow "A" causes heads 16a and 16b to move toward and away from each other in the direction of double-headed arrow Referring to FIG. 2 in conjunction with FIG. 1, a jaw assembly, generally designated 26, is mounted between heads 16a and 16b of handles 12 for movement therewith. The jaw assembly, includes a first or lower jaw, generally designated 28, and a second or upper jaw, generally designated 30. The use of the terms "upper" and "lower" herein is for reference purposes only, in relation to the drawings, because the tool is omnidirectional in use or actual practice. Both jaws have mounting flanges 32 received within heads 16a and 16b, and a pair of pins 34 (FIG. 1) project through holes 36 (FIG. 2) to fix the jaws to their respective heads.

Each jaw 28 and 30 includes a first stage recessed area 38 which combines with the first stage recessed area of the other jaw to define a crimping cavity, generally designated 40 (FIG. 2), for compressing a connector component radially onto a cable when the jaws are relatively moved toward each other. In essence, crimping cavity 40 defines a central axis transversely of the tool which is generally parallel to pivot axis 18 of heads 16a and 16b which, in turn, comprises the pivot axis for jaws 28 and 30. Therefore, first stage recessed areas 38 of the jaws are effective to crimp a connector component radially onto a wire or cable. It can be seen that each recessed area 38 is three-sided to define a hexagonal crimping cavity 40.

Each jaw 28 and 30 includes a second stage shoulder area 42 and 44, respectively, which combine to define opposing arms 45a and 45b, respectively, for assembling a pair of connector components toward each other axially of the wire or cable when the jaws are relatively moved toward each other. The arms defined by shoulder areas 42 and 44 project from the jaws generally perpendicular to their pivot axis 18 (FIG. 1).

Figure 2:
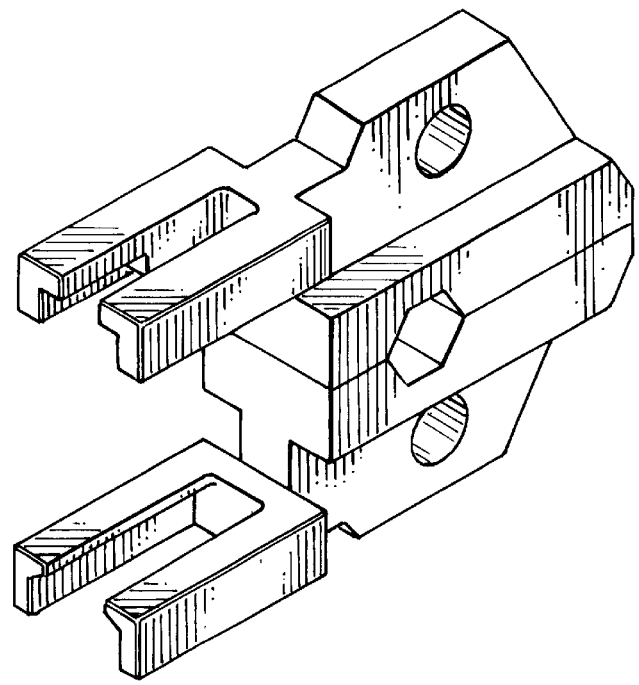
FIG. 2 is a perspective view of the jaw assembly isolated from the remainder of the tool.
Figure 3:
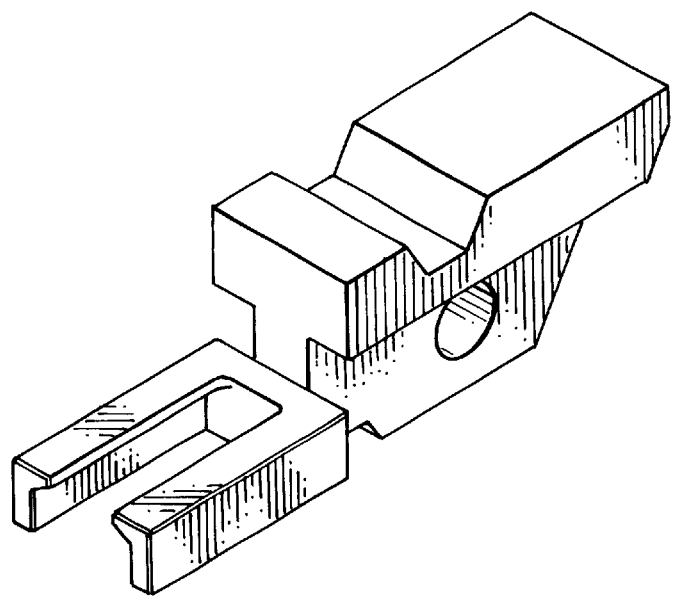
FIG. 3 is a perspective view of the lower jaw as viewed in FIG. 2.

Referring to FIG. 3 in conjunction with FIG. 2, second stage shoulder area 42 of lower jaw 28 is bifurcated by means of a slot 46 to define a pair of shoulders 42a spaced from each other for straddling a respective one of the pair of connector components that are to be axially assembled. In other words, the connector component will be inserted into slot 46 and appropriate shoulders on opposite sides of the connector component can engage spaced shoulders 42a on opposite sides of slot 46.

Figure 4:
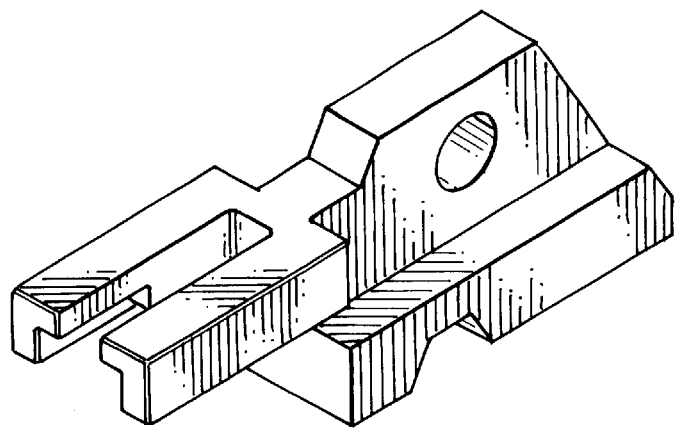
FIG. 4 is a perspective view of the upper jaw as viewed in FIG. 2.

Referring to FIG. 4 in conjunction with FIGS. 1 and 2, second stage shoulder area 44 of upper jaw 30 also is bifurcated by means of a slot 48 to define a pair of spaced shoulders 44a for straddling another connector component such that appropriate shoulders on opposite sides of the component engage spaced shoulders 44a on opposite sides of slot 48 of upper jaw 30. Therefore, a pair of connector components (usually with one of the components crimped to a cable by first stage recessed areas 38) are respectively inserted into slots 46 and 48. When tool 10 is closed by moving handles 12 toward each other, second stage shoulder areas 42 and 44 of jaws 28 and 30, respectively, move toward each other to completely assemble the pair of connector components axially of the cable to which at least one component is terminated.

Figure 5:
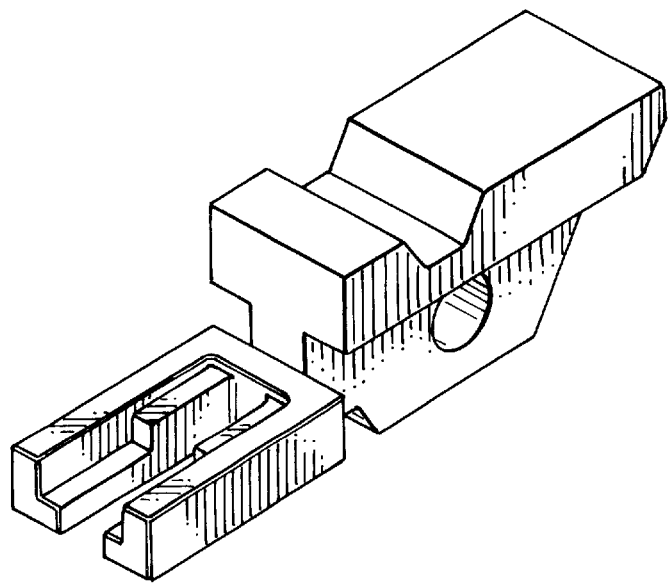
FIG. 5 is a perspective view of the upper jaw of FIG. 4, turned upside-down to better show the second stage shoulder area of the upper jaw.

Referring to FIG. 5 in conjunction with FIGS. 1, 2 and 4, second stage shoulder area 44 of upper jaw 30 has additional pairs of shoulders 50 and 52 in a stepped configuration to define different levels of shoulders relative to the pair of shoulders 44a. Again, one shoulder in each pair 50 and 52 thereof is located on each opposite side of slot 48. In essence, these various stepped shoulders 44a, 50 and 52 are spaced at different distances from shoulders 42a (FIG. 3) of second stage shoulder area 42 of lower jaw 28 to accommodate differently configured connector components or connector components of different sizes.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A crimping tool for compressing a connector component radially onto a cable and for assembling a pair of connector components axially of the cable, comprising:

a pair of jaws relatively movable about a pivot axis toward and away from each other, each jaw including a first stage recessed area combining with the first stage recessed area of the other jaw to define a crimping cavity in opposing faces of the jaws facing generally tangentially of the pivot axis for compressing the connector component radially onto the cable when the jaws are relatively moved toward each other, each jaw including a second stage shoulder area combining with the second stage shoulder area of the other jaw to define opposing arms extending from distal ends of the jaws generally radially of the pivot axis for assembling said pair of connector components toward each other axially of the cable when the jaws are relatively moved toward each other, said opposing arms being bifurcated to allow said pair of connector components to pass therethrough axially of the cable, and at least one of said opposing arms including at least two shoulders spaced at different distances from the other opposing arm to accommodate differently configured connector components.

2. The crimping tool of claim 1 wherein said first stage recessed areas are three-sided to define a hexagonal crimping cavity.

3. A crimping tool for compressing a connector component radially onto a cable and for assembling a pair of connector components axially of the cable, comprising:

a pair of jaws relatively movable toward and away from each other about a pivot axis, each jaw including a first stage recessed area combining with the first stage recessed area of the other jaw to define a crimping cavity in opposing faces of the jaws for compressing the connector component radially onto the cable when the jaws are relatively moved toward each other, with the cavity defining an axis generally parallel to said pivot axis and with the opposing faces of the jaws facing tangentially of the pivot axis, each jaw including a second stage shoulder area combining with the second stage shoulder area of the other jaw to define opposing arms for assembling said pair of connector components toward each other axially of the cable when the jaws are relatively moved toward each other, with the opposing arms projecting in a direction generally perpendicular to said pivot axis, said first stage recessed areas being closer to the pivot axis than said second stage shoulder areas, said opposing arms being bifurcated to allow said pair of connector components to pass therethrough axially of the cable, and at least one of said opposing arms including at least two shoulders spaced at different distances from the other opposing arm to accommodate differently configured connector components.

4. The crimping tool of claim 3 wherein said first stage recessed areas are three-sided to define a hexagonal crimping cavity.

* * * * *